(12) United States Patent
Ben-Arie

(10) Patent No.: US 10,932,598 B2
(45) Date of Patent: *Mar. 2, 2021

(54) ROTATIONAL DISPENSER I

(71) Applicant: Jezekiel Ben-Arie, Carlsbad, CA (US)

(72) Inventor: Jezekiel Ben-Arie, Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/746,953

(22) Filed: Jan. 19, 2020

(65) Prior Publication Data

US 2020/0146480 A1 May 14, 2020

Related U.S. Application Data

(63) Continuation-in-part of application No. 16/159,721, filed on Oct. 15, 2018, now Pat. No. 10,575,668.

(51) Int. Cl.

| | |
|---|---|
| *A47G 19/34* | (2006.01) |
| *A47G 19/24* | (2006.01) |
| *B65D 83/06* | (2006.01) |
| *A47J 47/01* | (2006.01) |
| *A47J 42/14* | (2006.01) |

(52) U.S. Cl.
CPC .............. *A47G 19/34* (2013.01); *A47G 19/24* (2013.01); *A47J 47/01* (2013.01); *B65D 83/06* (2013.01); *A47J 42/14* (2013.01)

(58) Field of Classification Search
CPC ......... A47G 19/24; A47G 19/34; A47J 42/14; A47J 42/16; A47J 47/01; B65D 83/06
See application file for complete search history.

(56) References Cited

U.S. PATENT DOCUMENTS

| 4,257,541 A * | 3/1981 | Souza ..................... G01F 11/24 |
| | | 222/362 |
| 4,691,821 A * | 9/1987 | Hofmann ................ A47G 19/34 |
| | | 206/216 |
| 4,832,235 A * | 5/1989 | Palmer ................... A47G 19/24 |
| | | 222/370 |
| 5,529,221 A * | 6/1996 | Roy ........................ A47G 19/34 |
| | | 222/181.2 |
| 6,189,742 B1 * | 2/2001 | Thomson ................ A47G 19/34 |
| | | 141/174 |
| 7,090,098 B2 * | 8/2006 | Livingston .............. G01F 11/46 |
| | | 222/651 |

(Continued)

*Primary Examiner* — Ryan A Reis

(57) ABSTRACT

A rotational seasoning dispenser with a dispensing mechanism that applies a rotating disk which has equally separated cavities. When each cavity is in the container the stored seasoning drops into and loads the cavity. Next, the disk transfers and dispenses the seasoning outside by turning the loaded cavities from the container to a dispensing aperture. The disk has smooth, parallel and planar upper and lower planes which slide closely fitting container's planar planes above and below it. This configuration hermetically isolates the container from the environment by providing simultaneous airtight covering of each cavity while it approaches and overlaps the dispensing aperture. This isolation prevents atmospheric moisture absorption which results in lumping of seasoning. The rotating cavities also can loosen lumped seasoning into particulates. An electrically motorized version of the dispenser is also included. The dispenser is configured to dispense substantially equal amounts of seasoning for each manual activation.

14 Claims, 6 Drawing Sheets

(56) References Cited

U.S. PATENT DOCUMENTS

| | | | |
|---|---|---|---|
| 9,500,509 B2* | 11/2016 | Egnor, Jr. | G01F 11/24 |
| 2016/0159636 A1* | 6/2016 | Ismail | B67D 3/0041 |
| | | | 222/1 |

* cited by examiner

ROTATIONAL DISPENSER I

CROSS-REFERENCE TO RELATED APPLICATIONS

This Application a Continuation In Part (CIP) of patent application: Ser. No. 16/159,721 filed on Oct. 15, 2018

FEDERALLY SPONSORED RESEARCH

Not Applicable.

SEQUENCE LISTING OR PROGRAM

Not Applicable.

TECHNICAL FIELD

The present invention relates to dispensers of seasoning.

PRIOR ART

Many devices were invented for dispensing particulate seasonings such as salt, pepper, spices and other dry particulate condiments. However the operation of a large majority of these dispensers is based on shaking the container and ejecting the seasoning particulates via a set of small apertures. The purpose of shaking is to accelerate the particulates in the container forwards and backwards. The forwards acceleration is converted into inertial forces forwards when the container is abruptly accelerated in the reverse direction. These inertial forces push and eject the particulates through a set of apertures whence due to gravity they fall on the food below. But shaking does not provide the user with accurate control on the amount dispensed since it depends on many unknown variables such as the shaking force, size of apertures which might be partially clogged, seasoning kind, dryness, particulates size and possible lumping of the seasoning.

However, seasonings and especially salt are naturally hygroscopic and have a tendency to absorb and accumulate atmospheric moisture which causes them to cluster (join together) into lumps both within the container and also at its apertures. Several salt dispensers such as U.S. Pat. No. 1,773,720 to Alland propose means for loosening lumped salt but loosening lumped salt or other seasoning still requires also to actively push them outside through the apertures. Shaking does not generate enough inertial force to propel moist seasoning particulates which tend to adhere to one another and to the walls of the container and to clog the apertures. Thus, one needs to apply additional propelling mechanism in order to achieve efficient dispensing. In our patent search, we could not find salt or other particulate seasoning dispensers with efficient means for pushing and ejecting salt or other seasoning.

BRIEF SUMMARY OF THE INVENTION

We have several goals in inventing and developing our Rotational Dispenser of which some feasible embodiments are illustrated in FIGS. 1-6:
1. To develop a seasoning rotational dispenser with a dispensing mechanism that loosens seasoning lumping in the container and separates them into particulates. In addition, it is desired that the user could manually activate a mechanism that transfers for each manual activation equally sized portions of the seasoning stored in the seasoning container and dispenses them outside.
2. To configure a seasoning container with a dispensing mechanism that can be easily held and operated manually. It is also advantageous if the dispenser dispenses the seasoning directly downwards without needing to downturn the dispenser.
3. To design a dispensing mechanism that dispenses substantially the same amount of seasoning for each manual activation. By this manner, the user can accurately control the amount of seasoning sprinkled on the food.
4. To develop seasoning dispenser with a dispensing mechanism which hermetically isolates the seasoning stored in the container from the surrounding atmospheric moisture, keeps them in strict dry condition and thus prevents absorption and accumulation of atmospheric moisture in the seasoning. In order to achieve this goal, the dispensing mechanism exposes only the dispensed amounts of seasoning.

In order to achieve the objectives listed above, our seasoning dispensing mechanism adopts the operational process of loading measured portions of seasoning inside the storage space of the container, transferring these portions outside the container and finally unloading and spreading them outside. We find that other prevalent seasoning dispensers dispense their seasoning via open apertures which are exposing their seasoning containers to environmental moisture. This prevalent approach does not prevent natural accumulation of moisture in hygroscopic seasoning, which causes excessive seasoning lumping and aperture blockage by moist and sticky seasoning. In contrast, our dispensing mechanism minimizes seasoning lumping by strict airtight isolation of the storage space of the container from the environment all the time. Therefore, our dispenser does not employ direct aperture dispensing. In order to avoid direct dispensing via apertures we employ a rotational dispenser that utilizes a rotation motion of a transferring disk to move cavities which are loaded with measured portions of seasoning in the storage space and then transfers the cavities with the measured seasoning portions from a storage space in the container which is isolated from the environment to a dispensing aperture which is connected to the environment outside. Next, the cavities are unloaded and their seasoning contents is dispensed outside. In addition, the motion inside the storage space of the cavities which are on the transferring disk in the container also loosens the lumped seasoning. At the same time the cavities are loaded with measured seasoning portions. Next, the transferring disk transfers these measured seasoning amounts to a dispensing aperture and spreads them outside via the dispensing aperture.

In order to achieve air tight isolation from the environment of the seasoning storage space of the container, the rotational dispenser is structured as follows: it includes a container with a storage space for storing the seasoning. The storage space is hermetically enclosed within a set of surrounding walls. The set of surrounding walls includes a bottom wall with a dispensing aperture, which is permanently isolated from the storage space by the transferring disk. The bottom wall of the storage space is planar and smooth and resides at the bottom of the storage space. The storage space further includes: a transferring disk which can be turned by an axle perpendicularly attached to the transferring disk. The axle is rotatably installed within the storage space. The transferring disk comprises: an upper planar surface and a lower planar surface which are parallel and smooth. The transferring disk also includes one or multiple cavities. Each cavity is connected to an upper aperture situated at the upper planar surface. Each cavity is also connected to a lower aperture situated at the lower planar surface. The storage space also includes a covering wall which is attached to the surrounding walls. The covering wall covers a partial area of the upper planar surface of the transferring disk. The covering wall has a lower covering surface which is planar and smooth.

In order to provide hermetic isolation of the storage space from the atmospheric environment outside, the transferring disk is configured to turn such that the upper planar surface of the disk slides closely fitting underneath the lower covering surface and the lower planar surface of the disk slides closely fitting on top of the planar bottom wall. The dispensing aperture in the bottom wall is connected to the atmospheric environment outside the container. The partial area of the transferring disk which is covered by the covering wall, is configured to be sufficiently large in order to provide a simultaneous covering of the dispensing aperture and each cavity when the cavity is partially or fully overlapping the dispensing aperture at any rotational position of the transferring disk. Such a simultaneous cover is configured to provide hermetical isolation of the storage space from the outside environment at any rotational position of the transferring disk.

The modus operandi of the rotational dispenser is as follows: the seasoning stored in the storage space is configured to drop into a cavity in the transferring disk and load the cavity via the upper aperture when the transferring disk is at a rotational position such that the upper aperture is not covered by the covering wall. Next, when the transferring disk moves the lower aperture such that it overlaps above the dispensing aperture, the seasoning which was loaded into the cavity is configured to drop out of the cavity into the outside environment via the lower aperture and via the dispensing aperture. In summation, the rotational dispenser facilitates loading, transferring and dispensing of the seasoning when the transferring disk moves each cavity from an uncovered position inside the storage space to a position overlapping the dispensing aperture, while hermetically isolating the storage space from the outside environment. In addition, the rotation of the upper apertures of the transferring disk's cavities, which when uncovered, are in engaged with the seasoning at the bottom of the storage space, loosens the seasoning lumps into particulates. So the transferring disk loosens the seasoning in addition to its main task to load transfer and dispense the seasoning.

A removable turning lid facilitates manual rotation of the transferring disk in the rotational dispenser. The turning lid is installed on top of the container's set of the surrounding walls which include a top side surrounding wall which has a cylindrical outer surface. The turning lid has a recess with a cylindrical inner surface which hermetically fits the cylindrical outer surface. In addition, the turning lid has at the center of the recess a detachable mechanical coupling which couples with the axle of the transferring disk. Thus, turning the removable turning lid facilitates turning the axle along with the perpendicularly attached transferring disk while keeping an airtight sealing of the container. Since the turning lid is removable, it facilitates supplementing the storage space with additional seasoning.

Each cavity or other disk feature is measured by "the feature's angular section" which is equivalent to the angular displacement between two radial lines centered at the disk's center which enclose that feature. So, if the feature is a cavity, a "cavity angular section" is the angular displacement between two radial lines centered at the disk's center which enclose the cavity. Also each space between two cavities on the transferring disk is measured by "space angular section" it occupies on the transferring disk. Similarly, the dispensing aperture is also measured by its "dispensing angular section" it occupies on the transferring disk. The "partial area angular section" is also measured the same way. Hence, in order to provide a simultaneous cover of the dispensing aperture and each one of the cavities when each cavity is partially or fully overlapping the dispensing aperture at any rotational position of the transferring disk, the partial area is required to occupy a partial area angular section on the transferring disk which is larger than the sum of the dispensing angular section plus twice the cavity angular section which pertains to the largest cavity. As an additional condition for hermetical isolation of the storage space it is also required that each of the space angular sections will be larger than the dispensing angular section.

In order to prevent penetration and wedging of seasoning particulates between the lower covering planar surface of the covering wall and the upper planar surface of the transferring disk, the covering wall is configured to have tapered radial edges at the radial boundary segments of the covering wall. These radial boundary segments are in touch with the transferring disk. These are two radial edges. The tapering deflects upwards and away from the surfaces, the seasoning particulates which reach the tapered radial edges.

The axle is rotatably installed in an airtight bearing situated at the center of the bottom wall. To provide solid support to the axle, the axle is also rotatably installed in a support bearing situated at the axial location of the covering wall.

In another option, instead of manual operation it is suggested to equip the turning lid within its recess with an electrical motor, an electrical power source and a push button electrical switch. Wherein the electrical motor, the electrical power source and the push button electrical switch are electrically connected. The electrical motor is mechanically coupled with the axle, which facilitates turning of the axle when the electrical motor is turned on by manually pressing the push button electrical switch. The activation of the electrical motor turns the transferring disk and it dispenses seasoning.

BRIEF DESCRIPTION OF THE DRAWINGS

FIG. 4 also shows the wedge's fitting depression which is carved out at the top inner face of the cylindrical wall of the container.

FIG. 5 also shows the round protrusion's fitting depression which is carved at the outer face of the top cylindrical wall of the container.

DETAILED DESCRIPTION OF THE DRAWINGS

Figure 1:
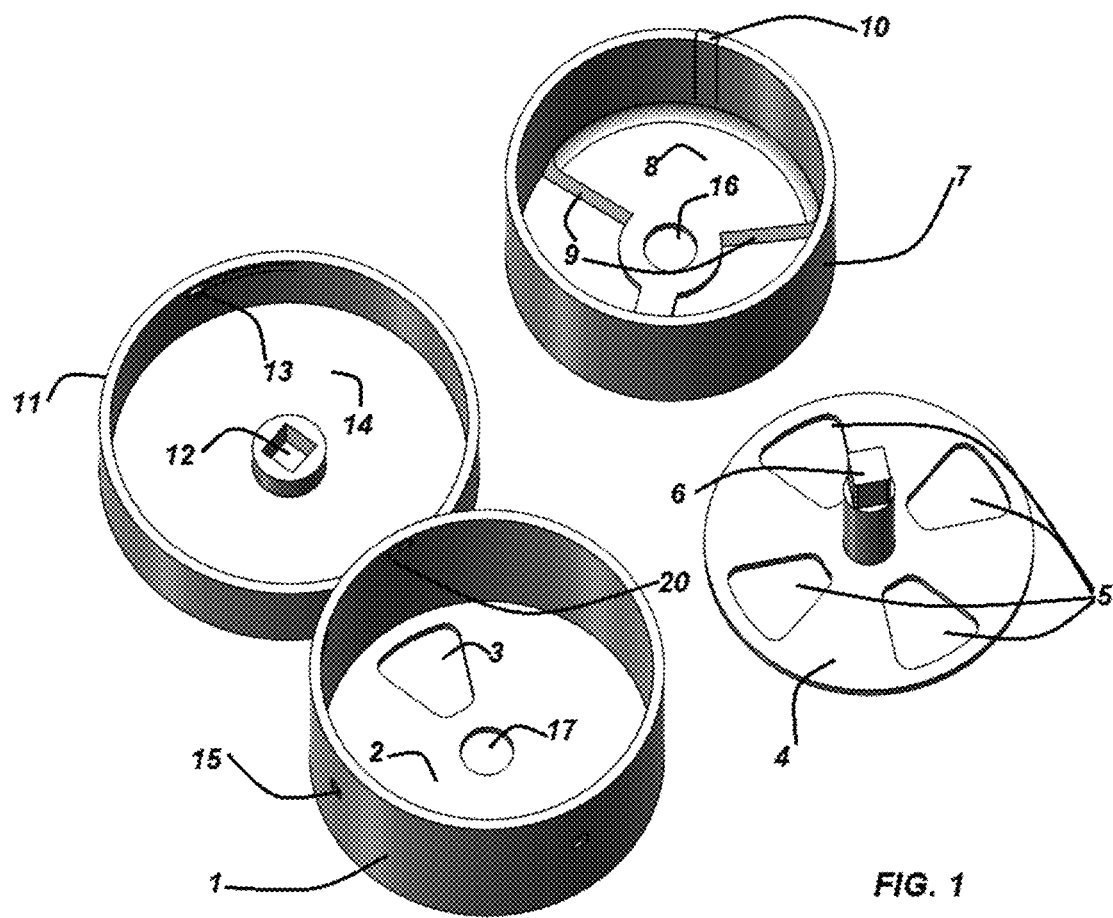
FIG. 1 illustrates the four parts in 3D isometric drawing of an embodiment of a rotational seasoning dispenser for manual operation.

FIG. 1 illustrates the four parts in 3D isometric drawing of an embodiment of a seasoning rotational dispenser for manual operation: the container 1, which includes the outer cylindrical shell (also called the upper side cylindrical surrounding wall, where the other part of the surrounding wall set is the bottom wall 2) where inside the shell is the seasoning storage space. The other 3 parts are: the transferring disk 4, the covering wall 7 and the turning lid 11. The container 1 has a cylindrical wall which encircles a planar and smooth bottom wall 2. The bottom wall 2 has the dispensing aperture 3 and the bottom support bearing 17 which gives airtight support to the axle 6. The dispensing aperture 3 occupies a "dispensing angular section" of 40 degrees—in this embodiment. The transferring disk 4 has four cavities 5 which in this embodiment each cavity occupies a "cavity angular section" of 40 degrees. The cavities are separated by four equal spaces with "space angular sections" of 50 degrees each. The axle 6 is perpendicularly attached to the transferring disk and facilitates the disk's rotation. The upper tip of the axle 6 has a square cross section which fits square recess 12 at the center of the turning lid 11. The square recess 12 serves as a mechanical coupling of the turning lid 11 with the axle 6. The lid 11 also has a cylindrical wall 13 which air tightly fits the cylindrical surrounding wall of the container 1 and provides a hermetical sealing to the storage space of the container 1. The cylindrical wall 13 also encircles the lid's recess and the lid's ceiling 14. The arrow 13 also points out to the round protrusion 13 made in the lid's cylindrical wall that will be described in detail in FIG. 5. The covering wall 8 is attached to a cylindrical wall 7, which fits the inner cylindrical container's wall 1. The wedge 10 at the top of the cylindrical wall 7, holds in place the cylindrical wall 7 within the container's wall 1. The covering wall 8 has two radial edges 9 which are tapered in order to prevent wedging of the seasoning particulates between the lower planar surface of the covering wall 8 which slides on top of the upper planar surface of the transferring disk 4. The covering wall 8 covers a "partial area" on the transferring disk. In order to provide airtight isolation of the storage space from the outside environment, a sufficiently large partial area of the transferring disk must be covered all the time. The "partial area angular section" must be larger than the sum of the dispensing angular section plus twice the largest cavity angular section. In this embodiment the "partial area angular section" occupies 140 degrees which is larger than the "dispensing angular section" of 40 degrees plus twice the largest "cavity angular section" i.e. 2×40 degrees which sums up to 120 degrees. At the center of the covering wall 8 there is a bearing 16 that provides support to the axle 6. A wedge 10 which is attached at the end of an elastic arm also is included in the cylindrical wall 7.

Figure 2:
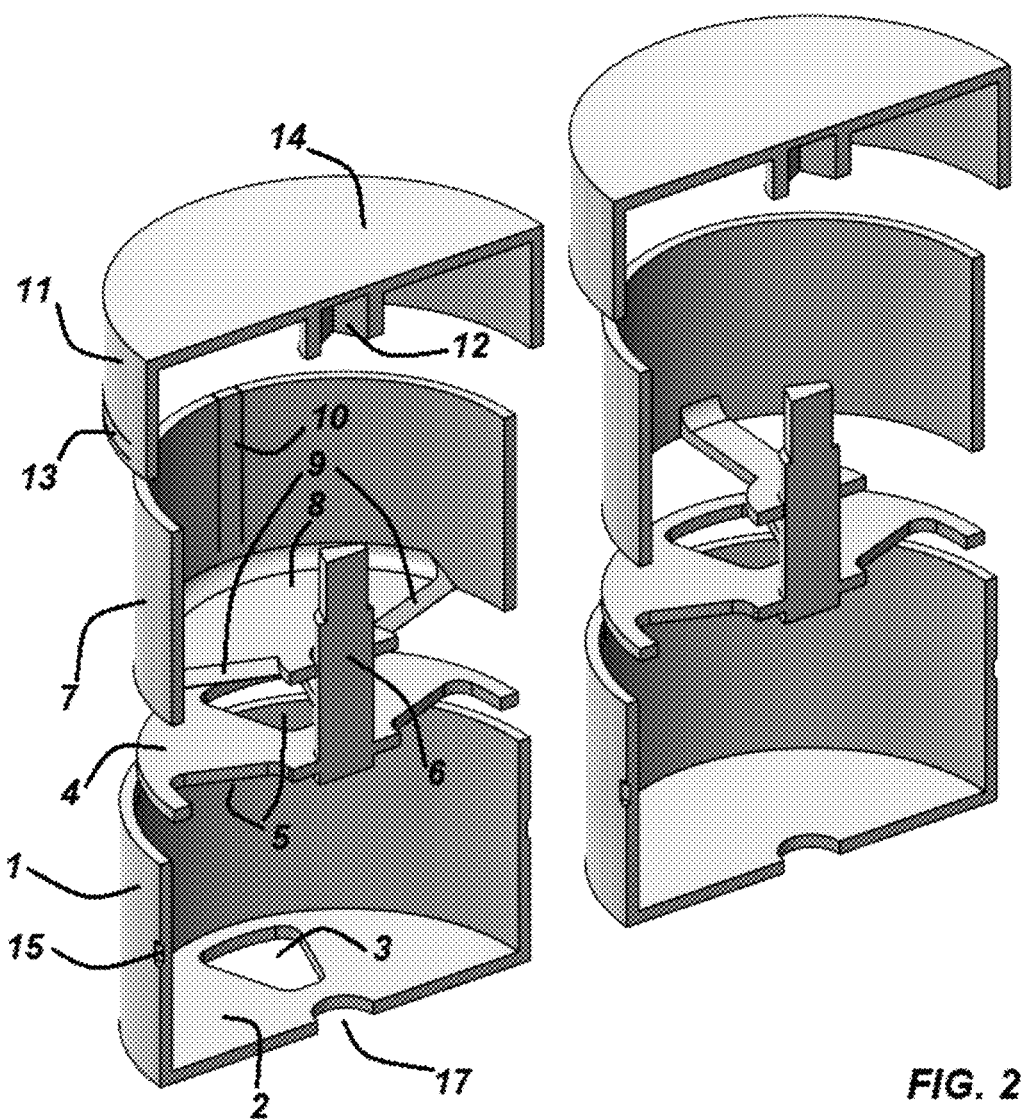
FIG. 2 Depicts in 3D isometric drawing a disassembled arrangement of the two halves of a cross sectioned manual seasoning dispenser. The 4 cross sectioned parts of the dispenser are shown in their relative positions in the assembled dispenser.

FIG. 2 Depicts in 3D isometric drawing a rotational dispenser which is disassembled into its four parts, each part cross sectioned into two halves and all the eight haves are arranged in two vertical piles. Each pile of four cross sectioned halves correspond in their shapes and their relative positions to a full rotational dispenser which is disassembled and cross sectioned. At the bottom of the two piles is the container 1 which is cross sectioned and illustrated as two halved container. The dispensing aperture 3 is shown at the bottom wall 2 of the left cross sectioned half. Two halves of the transferring disk 4 are illustrated on top of the two halves of the container 1. Two halves of the axle 6 which is perpendicularly attached to the transferring disk 4, is supported by the bottom bearing 17 and by the support bearing 16 at the center of the covering wall 8 which is illustrated above the transferring disk 4 as two cross sectioned halves of part 7. The turning lid 11 is drawn on top of covering wall part 7. Visible at the left side of the turning lid 11 is the round bulge 13 attached at the end of an elastic arm installed at the bottom of the cylindrical wall of the lid 11. At the center of the lid's recess, is the mechanical coupling 12 which has a square cavity 12 which fits the square tip of the axle 6.

Figure 3:
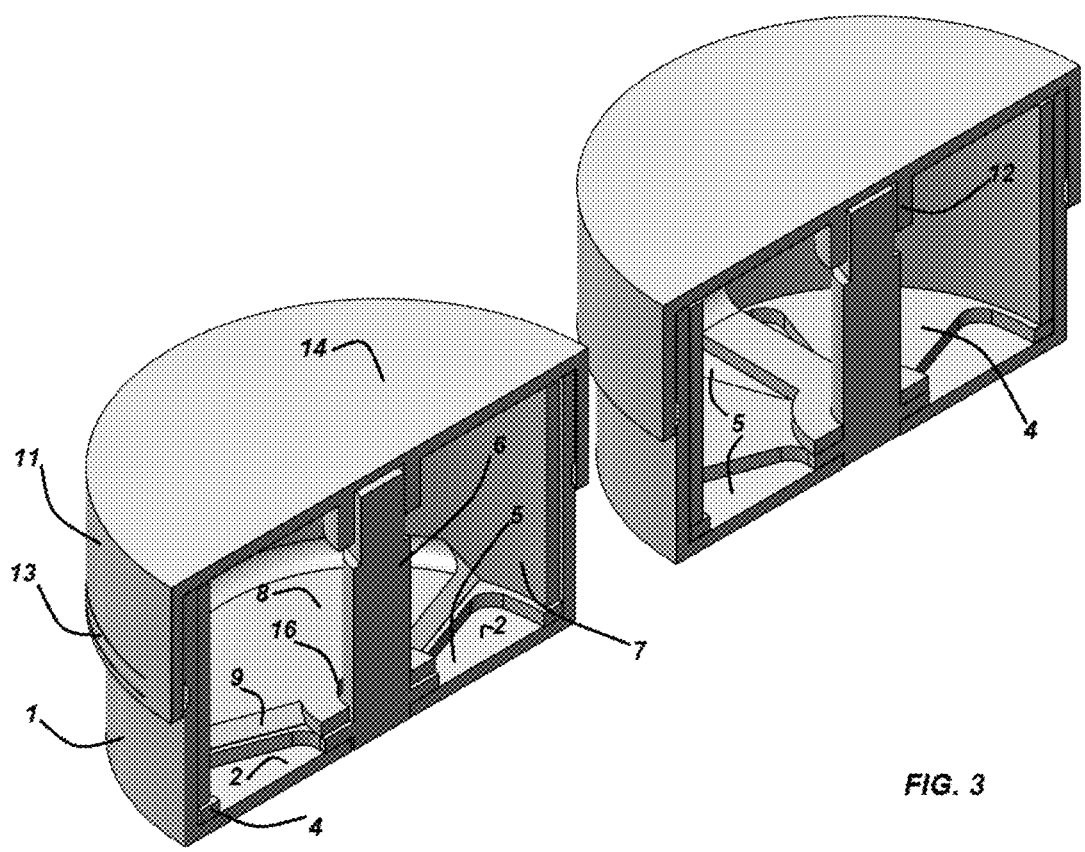
FIG. 3 Depicts in 3D isometric drawing the two halves of a cross sectioned manual seasoning dispenser. The 4 cross sectioned parts of the dispenser are shown in their actual positions in the assembled dispenser.

FIG. 3 Depicts in 3D isometric drawing the two halves of a cross sectioned manual seasoning dispenser. The 4 cross sectioned parts of the dispenser are shown in their actual positions in the assembled dispenser. FIG. 3 has the same two cross sectioned four parts halves as depicted in FIG. 2 but they are fully assembled in FIG. 3.

Figure 4:
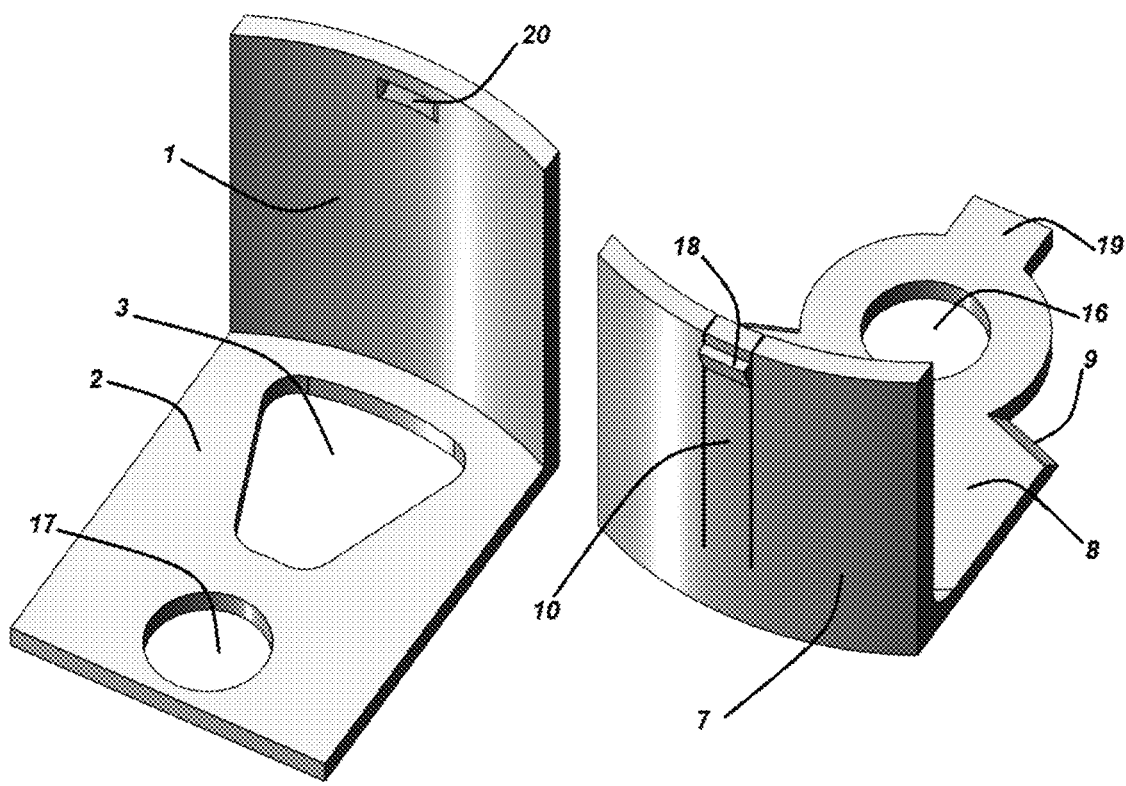
FIG. 4 illustrates in 3D isometric drawing an enlargement of a wedge attached to the top of an elastic arm which is connected to the covering wall part.

FIG. 4 illustrates in 3D isometric drawing an enlargement of the wedge 18 attached to the top of an elastic arm 10 which is connected to the covering wall part 7. The wedge 18 is inserted into a fitting depression 20 in order to accurately place the assembled covering wall part 7 into the container part 1. Also shown are partial views of the covering wall 8 with one of its tapered edge 9, the support bearing 16 at the center of the covering wall 8 and a bearing support arm 19. FIG. 4 also shows the wedge's 18 fitting depression 20 which is carved at the top of the inner face of the cylindrical wall of the container 1. Also shown are the dispensing aperture 3 and the airtight bearing 17 which were cut at the bottom wall 2.

Figure 5:
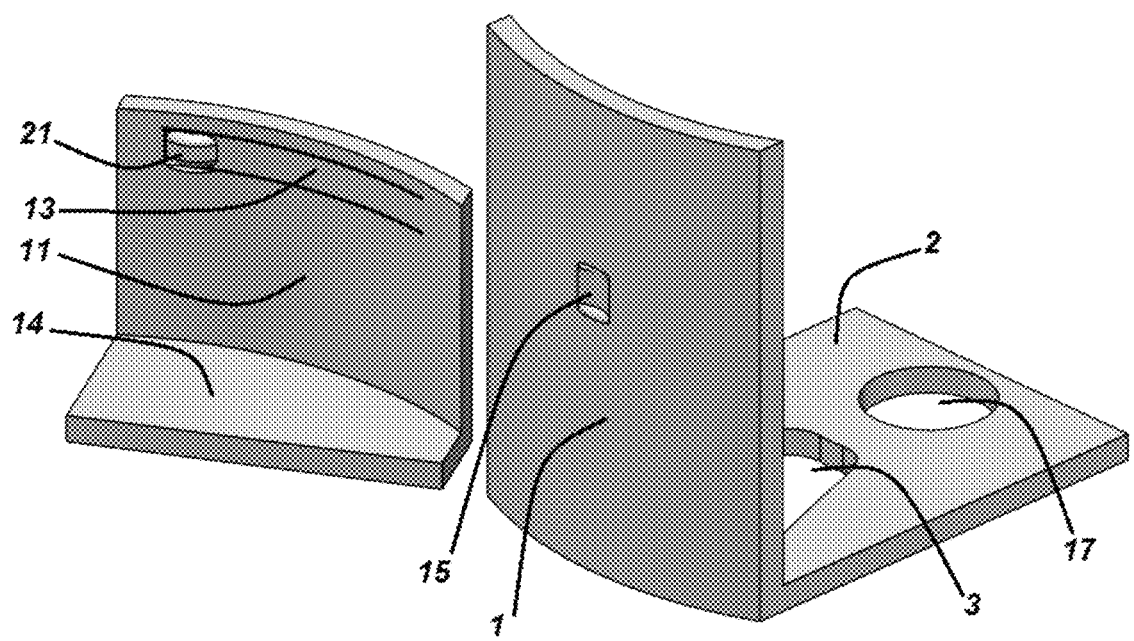
FIG. 5 illustrates in 3D isometric drawing an enlargement of a round protrusion which is attached at the end of an elastic arm which is connected to the cylindrical wall of the turning lid.

FIG. 5 illustrates in 3D isometric drawing an enlargement of a round protrusion 21 which is attached at the end of an elastic arm 13 which is a part of the cylindrical wall 11 of the turning lid 11. FIG. 5 also shows the round protrusion's fitting depression 15 which is carved at the outer face of the top cylindrical wall of the container 1. The depression 15 is placed at the location at which the round protrusion 21 lands on the top cylindrical wall of the container 1 when the turning lid turns the transferring disk such that one of its cavities 5 fully overlaps with the dispensing aperture 3. So the number of depressions 15 carved on top cylindrical wall of the container 1 corresponds to the number of cavities that are on the transferring disk 4. Also shown is a section of the bottom wall 2 of the container which includes the dispensing aperture 3 and the hermetic support bearing 17 configured to provide airtight support to the axle 6.

Figure 6:
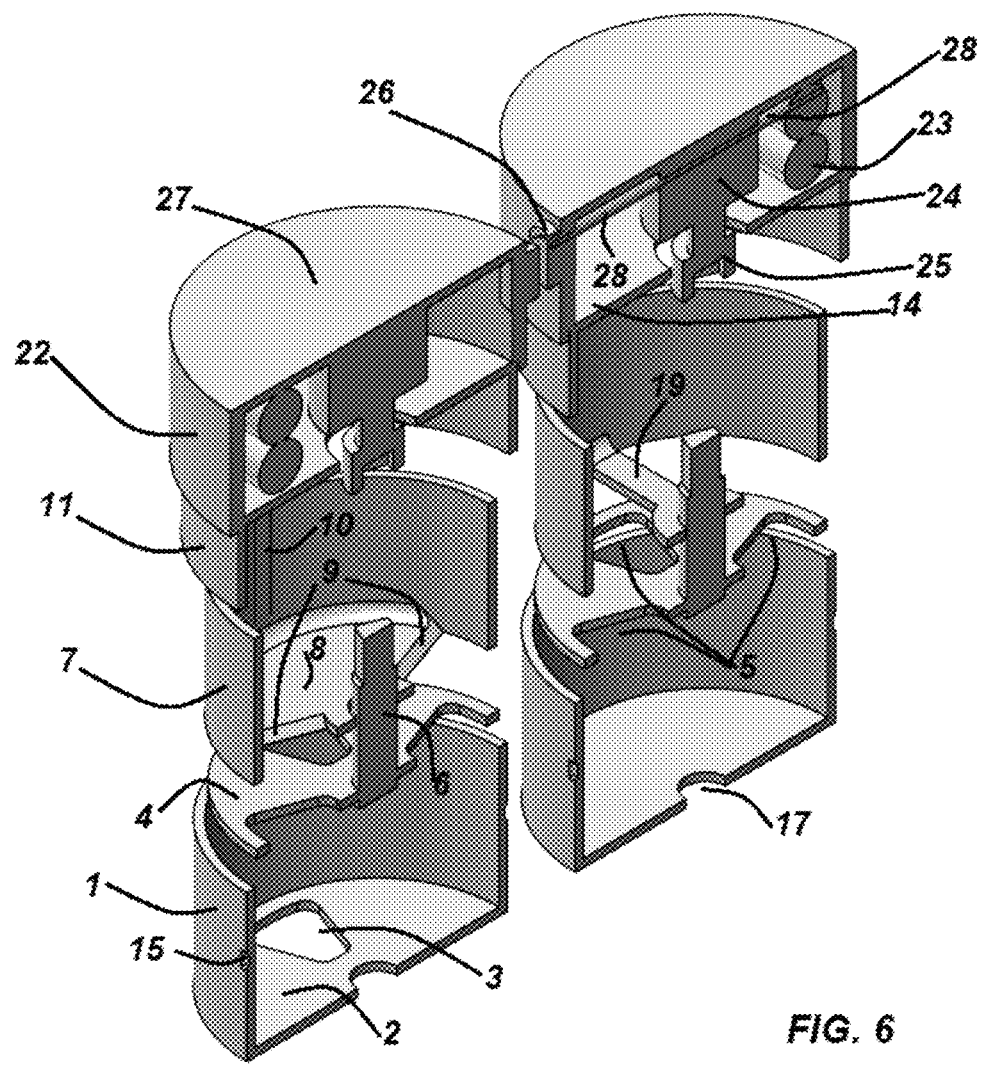
FIG. 6 Depicts in 3D isometric drawing a disassembled arrangement of the two halves of a cross sectioned motorized seasoning dispenser. The 4 cross sectioned parts of the dispenser are shown in their relative positions in the assembled dispenser. The removable lid on top now includes the electrical motor its power source and the electrical switch.

FIG. 6 Depicts in 3D isometric drawing a disassembled arrangement of the two halves of a cross sectioned rotational motorized seasoning dispenser. The eight halves of the four cross sectioned parts of the dispenser are shown in two piles which correspond to a full motorized rotational dispenser which was disassembled and halved. The turning lid 11 on top now has now a cylindrical box 22 with ceiling 27. The cylindrical box 22 includes an electrical motor 24, its power source 23, the electrical connections 28 between the motor 24, the power source 23 and the electrical push button switch 26. Manually pushing the push button switch 26 activates the electrical motor 24 which is connected by a mechanical coupling 14 to the axle 6. The coupling 14 facilitates rotating the axle 6 when the electrical motor 24 is activated. As illustrated in FIG. 6 the motorized version of the rotational dispenser differs from the manual rotational dispenser only by having the extra electrical components included in the cylindrical box 22.

What is claimed is:

1. A rotational dispenser which is configured to dispense a seasoning;
    wherein, the rotational dispenser comprising: a container
    wherein the container comprises: a storage space configured for storing the seasoning;
    wherein the container also comprises a set of surrounding walls; wherein the storage space is enclosed within the set of surrounding walls;
    wherein the set of surrounding walls includes a bottom wall with a dispensing aperture; wherein the bottom wall is planar and smooth and resides at a bottom side of the storage space;
    wherein the storage space includes: a transferring disk and an axle perpendicularly attached at a center of the transferring disk;
    wherein the axle is rotatably installed within the storage space and facilitates turning the transferring disk into a multiplicity of rotational positions;
    wherein the transferring disk comprises: an upper planar surface and a lower planar surface which are parallel and smooth;
    wherein the transferring disk also includes a multiplicity of cavities;
    wherein, each cavity is connected to an upper aperture situated at the upper planar surface; wherein each cavity is also connected to a lower aperture situated at the lower planar surface;
    wherein the storage space also includes a covering wall which is attached to the set of surrounding walls;
    wherein the covering wall covers a partial area of the upper planar surface;
    wherein the covering wall has a lower covering surface which is planar and smooth;
    wherein the transferring disk is configured to turn such that the upper planar surface slides closely fitting underneath the lower covering surface;
    wherein the transferring disk is configured to turn such that the lower planar surface slides closely fitting on top of the bottom wall;
    wherein the dispensing aperture is connected to an outside environment of the container;
    wherein the partial area is configured to be sufficiently large to provide a simultaneous covering of the dispensing aperture and each one of the cavities when that one of the cavities is partially or fully overlapping the dispensing aperture at some of the rotational positions of the transferring disk;
    wherein the simultaneous covering is configured to provide a hermetical isolation of the storage space from the outside environment at each one of the rotational positions of the transferring disk;
    wherein a portion of the seasoning stored in the storage space, is configured to drop into the cavity via the upper aperture and load the cavity when the transferring disk is at the rotational positions in which the upper aperture is not fully covered by the covering wall;
    wherein when the transferring disk moves the lower aperture such that it overlaps above the dispensing aperture, the portion of the seasoning which was loaded into the cavity is configured to drop out of the cavity into the outside environment via the lower aperture and via the dispensing aperture;
    wherein the storage space comprising: a sealable input opening which is configured to facilitate supplementing the storage space with the seasoning;
    wherein the rotational dispenser facilitates loading, transferring and dispensing of the seasoning when the transferring disk moves each cavity from an uncovered position inside the storage space to a position overlapping the dispensing aperture, while hermetically isolating the storage space from the outside environment;
    the rotational dispenser further comprising: a turning lid;
    wherein, the set of the surrounding walls include a top side surrounding wall which has a cylindrical outer surface;
    wherein the turning lid includes a recess with a cylindrical inner surface which hermetically fits the cylindrical outer surface; in addition, the turning lid has at a center of the recess a mechanical coupling which detachably couples with the axle;
    wherein, turning the turning lid facilitates turning the axle while keeping an airtight sealing of the container;
    wherein removing the turning lid from the top side surrounding wall, facilitates supplementing the storage space with the seasoning;
    wherein installing the turning lid on the top side surrounding wall seals the storage space.

2. The rotational dispenser, of claim 1 wherein the covering wall comprises two radial boundaries; wherein each radial boundary has a tapered radial edge.

3. The rotational dispenser, of claim 1 wherein the axle is rotatably installed in an airtight bearing situated at a center of the bottom wall.

4. The rotational dispenser, of claim 1 wherein the axle is rotatably installed in a support bearing situated at a center of the covering wall.

5. The rotational dispenser, of claim 1 wherein the recess comprises an electrical motor, an electrical power source and a push button electrical switch;
    wherein the electrical motor, the electrical power source and the push button electrical switch are electrically connected;
    wherein the electrical motor is detachably coupled with the axle;
    wherein when the electrical motor is turned on by manually pressing the push button electrical switch, it facilitates turning of the axle.

6. The rotational dispenser, of claim 1 wherein the turning lid comprises a round protrusion installed at the end of an elastic arm which is attached to the cylindrical inner surface of the recess;
    wherein the cylindrical outer surface comprises a multiplicity of round depressions; wherein each depression fits the round protrusion;
    wherein when the round protrusion lands into one of the round depressions, it indicates the rotational position of the transferring disk at which one of the cavities fully overlaps the dispensing aperture;
    wherein the number of round depressions equals the number of cavities on the transferring disk.

7. The rotational dispenser, of claim 1 wherein while the transferring disk is turning, each uncovered upper aperture is configured to move underneath the stored seasoning while engaged with the stored seasoning at the bottom of the storage space;

wherein moving the upper apertures while engaging with the stored seasoning loosen the stored seasoning at the bottom of the storage space into separate particulates.

8. A rotational dispenser which is configured to dispense a seasoning:
wherein, the rotational dispenser comprising: a container
wherein the container comprises: a storage space configured for storing the seasoning;
wherein the container also comprises a set of surrounding walls; wherein the storage space is enclosed within the set of surrounding walls;
wherein the set of surrounding walls includes a bottom wall with a dispensing aperture; wherein the bottom wall is planar and smooth and resides at a bottom side of the storage space;
wherein the storage space includes: a transferring disk and an axle perpendicularly attached at a center of the transferring disk;
wherein the axle is rotatably installed within the storage space and facilitates turning the transferring disk into a multiplicity of rotational positions;
wherein the transferring disk comprises: an upper planar surface and a lower planar surface which are parallel and smooth;
wherein the transferring disk also includes a cavity;
wherein, the cavity is connected to an upper aperture situated at the upper planar surface; wherein the cavity is also connected to a lower aperture situated at the lower planar surface;
wherein the storage space also includes a covering wall which is attached to the set of surrounding walls;
wherein the covering wall covers a partial area of the upper planar surface;
wherein the covering wall has a lower covering surface which is planar and smooth;
wherein the transferring disk is configured to turn such that the upper planar surface slides closely fitting underneath the lower covering surface;
wherein the transferring disk is configured to turn such that the lower planar surface slides closely fitting on top of the bottom wall;
wherein the dispensing aperture is connected to an outside environment of the container;
wherein the partial area is configured to be sufficiently large to provide a simultaneous covering of the dispensing aperture and the cavity when the cavity is partially or fully overlapping the dispensing aperture at some of the rotational positions of the transferring disk;
wherein the simultaneous covering is configured to provide a hermetical isolation of the storage space from the outside environment at each one of the rotational positions of the transferring disk;
wherein a portion of the seasoning stored in the storage space is configured to drop into the cavity via the upper aperture and load the cavity when the transferring disk is at the rotational position in which the upper aperture is not fully covered by the covering wall;
wherein when the transferring disk moves the lower aperture such that it overlaps above the dispensing aperture, the portion of the seasoning which was loaded into the cavity is configured to drop out of the cavity into the outside environment via the lower aperture and via the dispensing aperture;
wherein the storage space comprises a sealable input opening which is configured to facilitate supplementing the storage space with the seasoning;
wherein the rotational dispenser facilitates loading, transferring and dispensing of the seasoning when the transferring disk moves the cavity from an uncovered position inside the storage space to a position overlapping the dispensing aperture, while hermetically isolating the storage space from the outside environment;
the rotational dispenser further comprising: a turning lid;
wherein, the set of the surrounding walls include a top side surrounding wall which has a cylindrical outer surface;
wherein the turning lid includes a recess with a cylindrical inner surface which hermetically fits the cylindrical outer surface; in addition, the turning lid has at a center of the recess a mechanical coupling which detachably couples with the axle;
wherein, turning the turning lid facilitates turning the axle while keeping an airtight sealing of the container;
wherein removing the turning lid from the top side surrounding wall, facilitates supplementing the storage space with the seasoning;
wherein installing the turning lid on the top side surrounding wall seals the storage space.

9. The rotational dispenser, of claim 8, wherein the covering wall comprises two radial boundaries; wherein each radial boundary has a tapered radial edge.

10. The rotational dispenser, of claim 8, wherein the axle is rotatably installed in an airtight bearing situated at a center of the bottom wall.

11. The rotational dispenser, of claim 8, wherein the axle is rotatably installed in a support bearing situated at a center of the covering wall.

12. The rotational dispenser, of claim 8, wherein the recess comprises an electrical motor, an electrical power source and a push button electrical switch;
wherein the electrical motor, the electrical power source and the push button electrical switch are electrically connected;
wherein the electrical motor is detachably coupled with the axle;
wherein when the electrical motor is turned on by manually pressing the push button electrical switch, it facilitates turning of the axle.

13. The rotational dispenser, of claim 8, wherein the turning lid comprises a round protrusion installed at the end of an elastic arm which is attached to the cylindrical inner surface of the recess;
wherein the cylindrical outer surface comprises a round depression which fits the round protrusion;
wherein when the round protrusion lands into the round depression, it indicates the rotational position of the transferring disk at which the cavity fully overlaps the dispensing aperture.

14. The rotational dispenser, of claim 8, wherein while the transferring disk is turning, while uncovered the upper aperture is configured to move underneath the stored seasoning while engaging with the stored seasoning at the bottom of the storage space;
wherein moving the upper aperture while engaging with the stored seasoning loosens the stored seasoning at the bottom of the storage space into separate particulates.

* * * * *